(12) United States Patent
Ruetschi

(10) Patent No.: US 7,983,693 B2
(45) Date of Patent: Jul. 19, 2011

(54) PRESENCE BASED SYSTEM PROVIDING IDENTITY CONTEXT REMINDERS

(75) Inventor: Johannes Ruetschi, Boca Raton, FL (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 448 days.

(21) Appl. No.: 10/812,553

(22) Filed: Mar. 30, 2004

(65) Prior Publication Data

US 2005/0221820 A1  Oct. 6, 2005

(51) Int. Cl.
 *H04W 4/02* (2009.01)
(52) U.S. Cl. .................. 455/456.3; 455/414.1
(58) Field of Classification Search .... 455/456.1–456.6, 455/461, 414.1–414.4, 453.1–457, 444; 715/963; 370/328
See application file for complete search history.

(56) References Cited

U.S. PATENT DOCUMENTS

| | | | |
|---|---|---|---|
| 6,119,006 A | 9/2000 | Shaffer et al. | 455/440 |
| 6,167,122 A * | 12/2000 | Titmuss et al. | 379/93.15 |
| 6,477,374 B1 | 11/2002 | Shaffer et al. | 455/445 |
| 6,484,033 B2 * | 11/2002 | Murray | 455/456.3 |
| 6,553,232 B1 | 4/2003 | Shaffer et al. | 455/440 |
| 7,039,420 B2 * | 5/2006 | Koskinen et al. | 455/456.1 |
| 7,606,936 B2 * | 10/2009 | Mousseau et al. | 709/239 |
| 2005/0195802 A1 * | 9/2005 | Klein et al. | 370/352 |
| 2005/0198265 A1 * | 9/2005 | Veprek et al. | 709/224 |

OTHER PUBLICATIONS

OpenScape V1.0 Technical White Paper, 2003, Siemens Information and Communication Networks, Inc.

* cited by examiner

*Primary Examiner* — Matthew Sams

(57) ABSTRACT

A communications system of networked communications devices, method and program product for such a system. Location and presence information about system users is stored, e.g., in a central storage. An identity context reminder service monitors location and presence status for the communications devices for inconsistencies with stored user location and presence information. The identity context reminder service provides a reminder to a respective communications device for each inconsistency. An identity context reminder client may reside on the communications devices to facilitate managing identity context reminder notifications and stored location and presence information.

26 Claims, 3 Drawing Sheets

PRESENCE BASED SYSTEM PROVIDING IDENTITY CONTEXT REMINDERS

BACKGROUND OF THE INVENTION

1. Field of the Invention

The present invention is related to a multi-platform communications system and more particularly to an integrated real time location and presence based multi-platform communications system wherein groups of users maintain intragroup communications.

2. Background Description

Personal productivity applications or tools are well known and readily available for everyday use. Examples of such personal productivity tools include state of the art communications tools including text messaging such as instant messaging applications and e-mail, as well as personal information manager (PIM) software. These personal productivity tools are available as individual stand alone applications (e.g., America Online (AOL) Instant Messenger (AIM) from AOL, Eudora from Qualcomm Inc., and Palm Desktop from Palm, Inc.) or, integrated in a single office suite, e.g., Microsoft (MS) Outlook in MS Office from Microsoft Corporation. Further, personal productivity tools are available for a wide range of platforms, ranging from small hand held devices such as what are known as personal digital assistants (PDAs) and web enabled or third generation (3G) cell phones to larger personal computers (PC) and even to distributed or Internet based platforms.

Recently, full featured multi-platform communications applications, such as the OpenScape™ application from Siemens Information and Communications Networks, Inc., have integrated and adapted such personal productivity tools, including both voice and text based communications applications, into a single seamless collaborative workplace communications portal. These multi-platform communications applications tie together phone, voice mail, e-mail, text messaging, calendaring, instant messaging, and conferencing services allowing user groups to communicate and collaborate more efficiently.

Provided workgroup member or user information is kept current, dispersed users can communicate with one another without being constrained by geography, office location, or time zone. With up to date user information these multi-platform communications applications streamline business communications and improve user productivity, allowing workgroup members or users to minimize wasted time, e.g., by reducing or eliminating time spent playing phone tag. As a result, an enterprise employing such a multi-platform communications application can realize significant cost savings by reducing wasted employee time.

Unfortunately, presence based systems require users to set and keep current their identity context in a system user profile that is shared with other users as presence information. If a user forgets to update his/her identity context (which can occur frequently), the system presents inaccurate presence information to other subscribers and may fail to set the appropriate profile for the user. Consequently, the advantages of such a presence based system may be frustrated and potential cost savings lost.

Thus, there is a need for a way to keep location and presence status current and remind users to update such status as apparent status changes occur.

SUMMARY OF THE INVENTION

It is a purpose of the invention to reduce employee time wasted trying to contact business associates;

It is another purpose of the invention to simplify maintaining location and presence status up to date;

It is yet another purpose of the invention to remind users to update location and presence status whenever a status change is inconsistent with expected location and presence.

The present invention relates to a communications system of networked communications devices, method and program product for such a system. Location and presence information about system users is stored, e.g., in a central storage. An identity context reminder service monitors location and presence status for the communications devices for inconsistencies with stored user location and presence information. The identity context reminder service provides a reminder to a respective communications device for each inconsistency. An identity context reminder client may reside on the communications devices to facilitate managing identity context reminder notifications and stored location and presence information.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
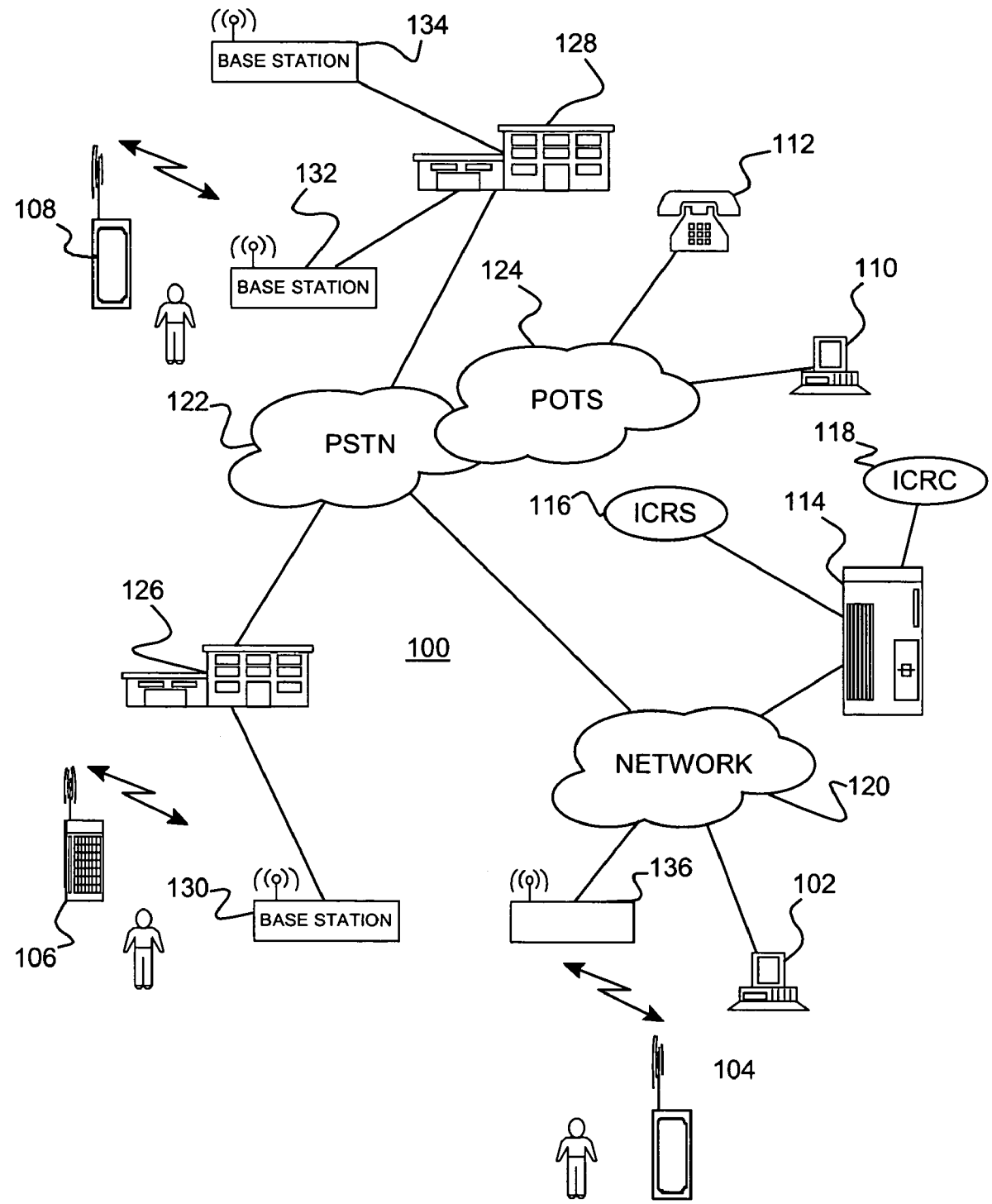
FIG. 1 shows an example of a preferred embodiment location and presence capable communications system that identifies potential user status changes and presents the user with an opportunity to update status accordingly.

Turning now to the drawings and, more particularly, FIG. 1 shows an example of a preferred embodiment presence based communications system 100 that identifies potential user status changes and presents the user with a reminder and an opportunity to update status accordingly. In particular, the present invention has application to any suitable presence based system such as, for example, the OpenScape system from Siemens Information and Communications Networks, Inc. See generally, *OpenScape V*1.0, *Technical White Paper*, Siemens Information and Communications Networks, Inc., 2003. A preferred presence based system 100 serves users connected on communications devices 102, 104, 106, 108, 110, 112, and that may be distributed over a wide geographic area.

Central storage (e.g., on computer usable medium in a server 114) stores identity context information for workgroup users on computer-readable medium, for example, employee calendar data, contact data or any data that might be found in a personal information manager (PIM) application. Optionally, identity context information may be stored at distributed locations, e.g., on one or more of the connected communications devices 102, 104, 106, 108, 110, 112. A rule based engine 116, e.g., on server 114, provides an identity context reminder service. The actual user location and presence information stored in central storage and included in each identity context depends upon the specific presence based service. So, the location and presence information may include personal information about members of a workgroup and other user data for selectively sharing amongst members of the particular workgroup. For example, the location and presence information can provide any suitable indication of the user's current whereabouts or status, e.g., "In Meeting," "Out to Lunch," "On vacation," "Working from home," and "On Business Trip."

The server 114 is connected to a network 120 that may be a local area network (LAN), the Internet or a combination thereof. The network 120 may be connected to a public switched telephone network (PSTN) 122. The PSTN 122 may include a Public Land Mobile Network (PLMN) and may be connected to an analog telephone network, e.g., the plain old telephone system (POTS) 124. The PLMN may include a number of base station controllers (BSCs) 126, 128, each of which includes one or more cells serviced by a local base transceiver station (BTS) 130, 132, 134. Some communications devices 102, 104 may directly connect to the network 120 or wirelessly, e.g., over a wireless access point 136. Wireless communications devices or Mobile Subscriber (MS) units 106, 108 in the cells wirelessly communicate through the particular local base station 130, 132, 134. Each BSC 126, 128 may be a different switching sub-domain (e.g., a different service area) within the system 100.

Typically, user identity context data including location and presence information is loaded into the central data storage on server 114 from any of the communications devices 102, 104, 106, 108, 110, 112 and/or from remote locations. The identity context reminder service provided by the rule based engine 116 is capable of monitoring each user's identity context for location and/or presence changes based on a stored expected event or presence time, calendar, location or, status. Communications devices 102, 104, 106, 108, 110, 112, each may maintain an optional identity context reminder client (e.g., a J2ME application or Microsoft® .NET™ compact framework base application) that manages identity context notifications. If a user fails to update his/her current status, the preferred presence based system 100 recognizes an inconsistency and sends a prompt to the particular communications device 102, 104, 106, 108, 110, 112, prodding the user, e.g., with a reminder to update identity context and, suggesting a new identity context. Thus, the identity context reminder service identifies changes that inadvertently cause inconsistent identity context for users, e.g., identifying an unscheduled location change. Then, a reminder is sent to the appropriate user notifying the user of the detected inconsistency or change. Then, the user can update identity context consistent with the change e.g., using the identity context reminder client.

Communications device 104 may be any suitable wireless network capable device or multi-function wireless capable device, e.g., wireless LAN/cell phone capable. Examples of wireless capability may include a wireless LAN (WLAN) or a Wi-Fi connection such as an IEEE 802.11a or 802.11b adapter, a cell phone capability or card or, a Bluetooth connection adapter. Each MS 106, 108 may be any suitable wireless communications device such as a second generation (2G) or third generation (3G) wireless communications device, e.g., a typical cellular phone 106 with text messaging, a wireless capable personal digital assistant (PDA) 108 or, a multi-function wireless capable device 104. Remote or teleworking workgroup members may connect, e.g., from home computer or terminal 110 or by telephone 112 over the POTS 124 and PSTN 122 to the network 120 and server 114. Personal computers 102 may include any number of suitable such general purpose stand alone computers, such as, for example, desktop computers, notebook computers, tablet computers and the like. The server 114 or mainframe computer may provide all of the central storage, location and presence services and the rule based engine for the presence based system.

Figure 2:
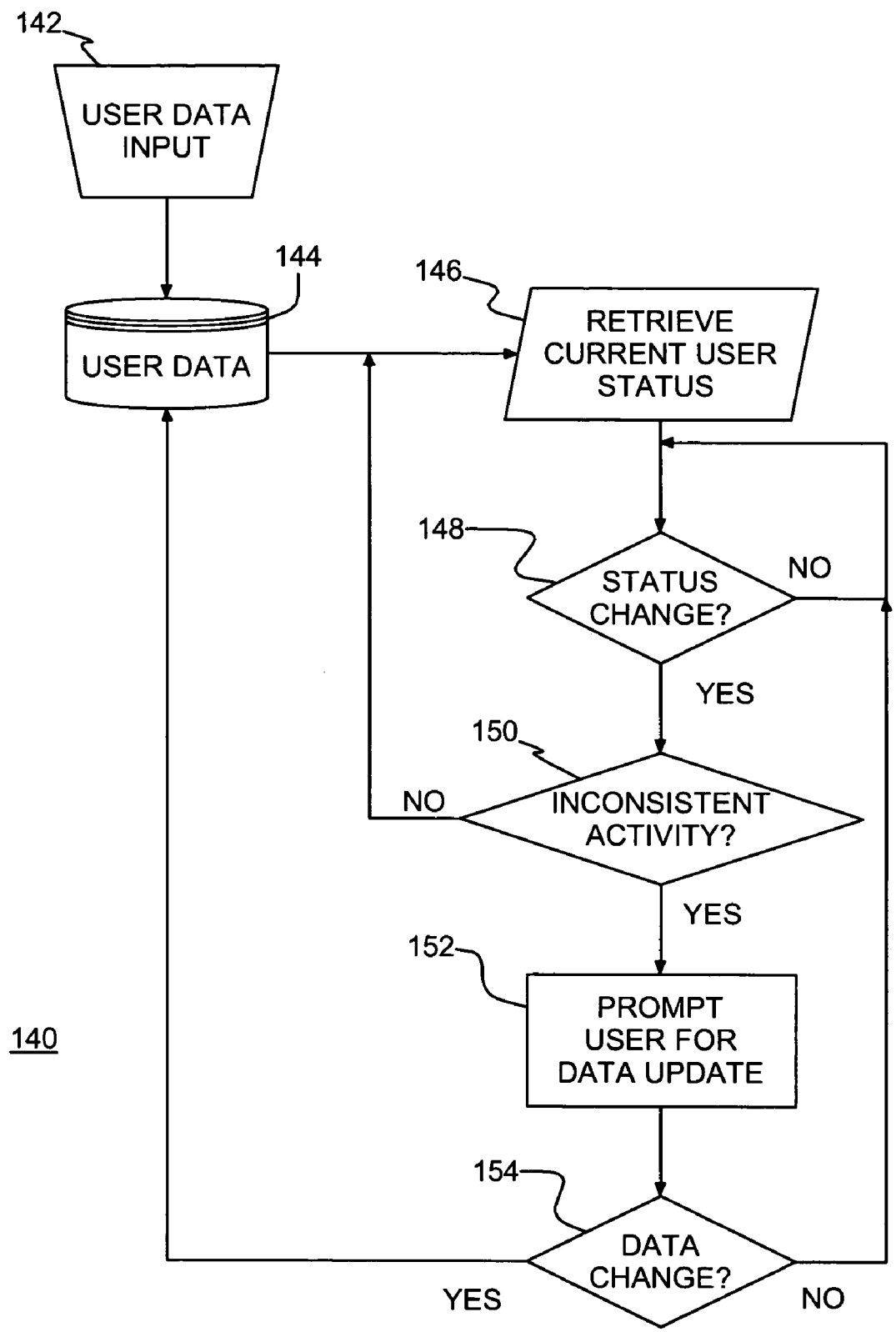
FIG. 2 shows an example of a flow diagram for providing identity context reminders.

FIG. 2 shows an example of a flow diagram 140 for providing identity context reminders according to a preferred embodiment of the present invention. Users provide location and presence data in step 142, which is stored in the central data repository in step 144. Next in step 146 the identity context reminder service retrieves location and presence information for each user, establishes location and presence services with the MS identified for each user and verifies each user's current status. In step 148 the identity context reminder service monitors users' location and/or presence status for changes and with each change, determines if the particular user's location and presence status is inconsistent with that user's stored information. When a user's location and/or presence status changes in step 148, the identity context reminder service identifies the changes. Then, in step 150 the identity context reminder service determines if the user's location and presence status is inconsistent with the user's stored information. If not, revised status may be retrieved in step 146 and the identity context reminder service continues to monitor for status changes in step 148. If in step 150 the change is unexpected and so, inconsistent with stored information, it may be necessary for the user to suggest a new context with an appropriate identity context reminder. In step 152, the identity context reminder service sends identity context reminders to the appropriate communications device, e.g., using a notification service. In step 154 if the user chooses not to update stored information, the identity context reminder service returns to step 148 and continuers to monitor for status changes. If, however, the user returns an update in step 154, the user's identity context is updated 144 and retrieved 164 by the identity context reminder service, which resumes monitoring status changes in step 148. Optionally, an identity context reminder client, if included at the MS, can update the stored information and, if necessary, clean the MS inbox of received reminders.

Figure 3:
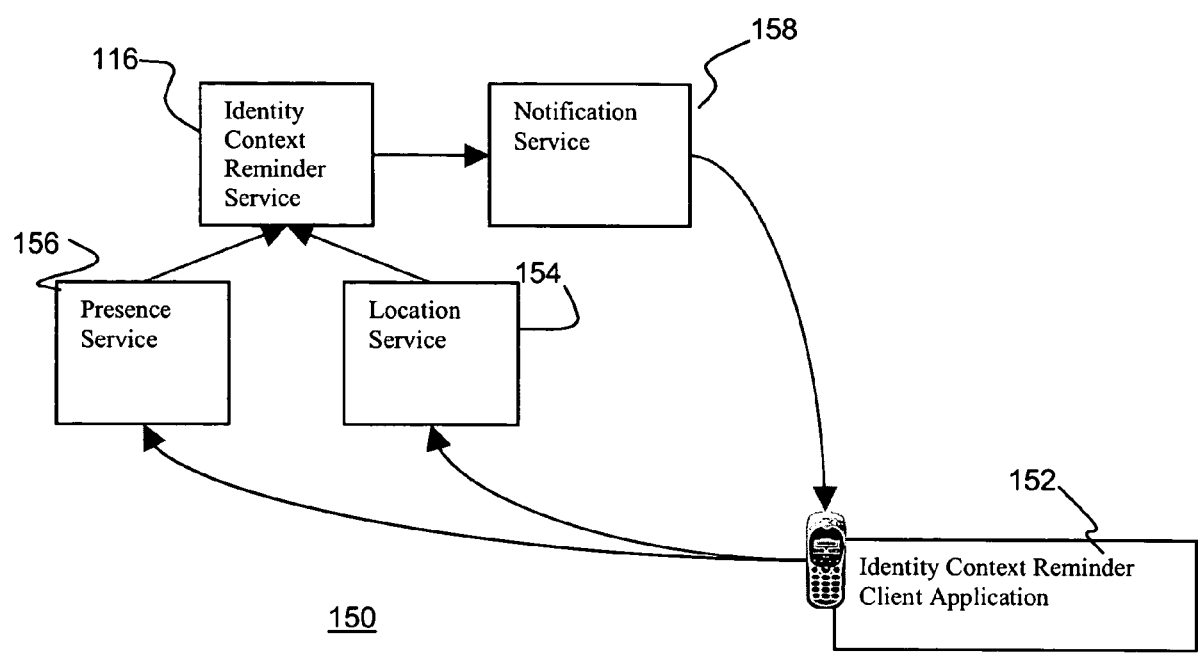
FIG. 3 shows an example of data flow between an identity context reminder service and an identity context reminder client on an endpoint that may provide location and presence information.

FIG. 3 shows an example of data flow between an identity context reminder service 116 with reference to the example of FIG. 1 and an identity context reminder client 152 on a typical MS, e.g., 108, which is an endpoint that may provide location and presence information. The identity context reminder service 116 has access to a location service 154 and a presence service 156. Also, a notification service 158 maintains communication with the endpoint 108, e.g., through a typical text messaging service such as instant messaging (IM), short message service (SMS), e-mail, or another similar message service. As noted hereinabove, the identity context reminder client 152 enables the user to conveniently manage identity context reminder notifications. So, for example, the user may be an employee carrying the MS 108 at an off-site meeting, e.g., in the cell serviced by BTS 132 and that is scheduled to last for 2 hours. When the MS 108 remains in that cell beyond the scheduled return, the preferred presence based system 100 privately prods the user with a reminder for a status update, e.g., automatically sends a query asking the user whether he/she would like to update stored information. Similarly, such prodding can be initiated, for example, when a MS 106, 108 moves between cells, when a wireless networked device 104 moves between access point 136 coverage areas or, when a user unexpectedly logs on from a terminal 102, 110. The user may respond with an update for stored location and presence information or, simply by ignoring the reminder. Thus, the user is reminded to update stale location and presence information or to leave the stored location and presence information.

Advantageously, the present invention automatically reminds group members to update identity context based on time, calendar, location, and current status.

While the invention has been described in terms of preferred embodiments, those skilled in the art will recognize that the invention can be practiced with modification within the spirit and scope of the appended claims.

What is claimed is:

1. A communications system comprising:
    a plurality of communications devices communicating with each other over a network, wherein said network includes a telephone network and a local area network (LAN), a first group of said plurality of communications devices being connected to said LAN and a second group being connected to said telephone network;
    a storage on said LAN storing location and presence information about system users, each of said plurality of communications devices being identifiable with at least one system user, and wherein ones of said system users are associated with more than one of said plurality of communications devices; and
    an identity context reminder service monitoring said plurality of communications devices for current location and presence status for associated users and comparing said current location and presence status for inconsistencies with an expected location and presence for said associated users from stored said location and presence information wherein for each of said ones said identity context reminder service monitors multiple associated devices of said plurality of communications devices for inconsistencies in one or more, inconsistencies further being indicated by a system user indicated as being at a communications device other than an associated one, said identity context reminder service selectively providing a reminder to respective communications device of said plurality of communications devices responsive to an inconsistency.

2. A communications system as in claim 1, further comprising a presence service receiving current presence status for said associated users from said plurality of communications devices and providing received said current presence status to said identity context reminder service.

3. A communications system as in claim 2, wherein inconsistencies further include a system user logging on to a computer at a location other than a currently expected location and at least one said reminder indicates that a user associated with said respective communications device is at a location other than a previously scheduled expected location for said associated user.

4. A communications system as in claim 1, further comprising a location service receiving current location status for said associated users from said plurality of communications devices and providing received said current location status for said associated users to said identity context reminder service.

5. A communications system as in claim 4, wherein at least one said reminder indicates that an associated user identified to said respective communications device is at a location other than an expected location for said associated user.

6. A communications system as in claim 1, wherein said communications system further comprises a notification service, said identity context reminder service identifying a selected one of said plurality of communications devices and said notification service providing said reminder to said selected one.

7. A communications system as in claim 6, wherein said notification service is a text based messaging service.

8. A communications system as in claim 7, wherein said text based messaging service is selected from the group consisting of e-mail, instant messaging and short message service (SMS).

9. A communications system as in claim 1, further comprising an identity context reminder client on at least one communications device of said plurality of communications devices, said identity context reminder client facilitating managing identity context reminder notifications from said at least one communications device.

10. A communications system as in claim 1, wherein said telephone network comprises a cellular phone network and the plain old telephone network (POTS) and said at least one of said communications devices comprises a mobile station (MS) in a cellular phone network.

11. A communications system as in claim 1, wherein said identity content service is located on a server with said storage, and said communications system further comprises a rules based engine on said server monitoring said current location and presence status on said plurality of communications devices for said system users and providing said identity context reminder service.

12. A method of maintaining location and presence status current in a communications system including a plurality of communications devices networked together, said method comprising the steps of:
    a) storing location and presence information for a user identified with one or more communications devices, one or more said user being associated with more than one of said plurality of communications devices, at least one of said plurality of communications devices being connected to a Local Area Network (LAN) and at least one other of said plurality of communications devices being connected to a telephone network connected to said LAN;
    b) monitoring said plurality of communications devices for current location and presence status for system users, wherein for each said one or more user said identity context reminder service monitors multiple associated devices of said plurality of communications devices for current location and presence status for said each one or more user;
    c) comparing said current location and presence status to stored said location and presence information to identify inconsistencies for said system users, inconsistencies including a system user indicated as being at a communications device other than an associated one; and
    d) sending a notification to an identified user at a corresponding one of said one or more communications devices.

13. A method as in claim 12, wherein inconsistencies further include a system user logging on to a computer at a location other than a currently expected location and said notification is provided as a text message displayed by at least one of said one or more communications devices.

14. A method as in claim 12, further comprising the step of:
    e) updating stored said location and presence information.

15. A method as in claim 14, wherein said one or more communications devices is a plurality of communications devices, each connected to one of said telephone network and said LAN and identified with a particular communications system user, said stored location and presence information for said particular communications system user being updated and managed from said one or more communications devices.

16. A computer program product, when provided to and executed by a processor, sharing user location and presence status amongst a plurality of users identified with communications devices networked together in a communications system, said computer program product comprising a non-transitory computer usable medium having computer readable program code stored thereon, said computer readable program code comprising:

computer program code means for storing user location and presence information;

computer program code means for monitoring a plurality of communications devices each connected to one of said telephone network and Local Area Network (LAN) and associated with a user for current location and presence status for associated users, one or more said associated user being associated with more than one of said plurality of communications devices, wherein for each said one or more user multiple associated devices of said plurality of communications devices are monitored for current location and presence status for said each one or more user;

computer program code means for identifying inconsistencies between stored said user location and presence information and said current location and presence status of a system user; and computer program code means for providing notification of an identified inconsistency to a corresponding communications device associated with said user, inconsistencies including a system user indicated as being at a communications device other than an associated one.

17. A computer program product as in claim 16, wherein said computer program code means for providing notification comprises computer program code means for sending text messages to selected ones of said plurality of communications devices.

18. A computer program product as in claim 17, wherein said text messages comprise e-mail, instant messages and short message service (SMS) messages.

19. A computer program product as in claim 16, wherein inconsistencies further include a system user logging on to a computer at a location other than a currently expected location and said computer program product further comprising computer program code means for receiving location and presence updates from ones of said plurality of communications devices.

20. A computer program product, when provided to and executed by a processor, managing location and presence information for users associated with one or more respective communications device amongst a plurality of communications devices networked together in a communications system, said computer program product comprising a non-transitory computer usable medium having computer readable program code stored thereon, said computer readable program code comprising:

computer program code means for providing current user location and presence status to a location context reminder service, wherein ones of said users are associated with more than one of said plurality of communications devices, each communications device provides device location and indicates user presence as current user location and presence status to said communications system, and for each of said ones multiple associated devices of said plurality of communications devices each provides current device location and indicates user presence to said identity context reminder service;

computer program code means for indicating receipt of reminders, received said reminders indicating inconsistencies between expected current said user location and presence information and actual current said user location and presence status, wherein for said each of said ones inconsistencies are in one or more of said multiple associated devices and include a system user being indicated at a communications device other than an associated device; and computer program code means for providing user location and presence information updates to said location context reminder service.

21. A computer program product as in claim 20, wherein said computer program code means for indicating reminders comprises computer program code means for text messaging.

22. A computer program product as in claim 21, wherein said computer program code means for text messaging is selected from a group consisting of:

computer program code means for sending and receiving e-mail;

computer program code means for instant messaging; and computer program code means for sending and receiving short message service (SMS) messages.

23. A computer program product as in claim 22, wherein inconsistencies further include a system user logging on to a computer at a location other than a currently expected location and said computer program code means for indicating reminders selects said computer program code means for text messaging from said group.

24. A non-transitory computer-readable medium having stored thereon a plurality of instructions, the plurality of instructions including instructions which, when executed by a processor, cause the processor to:

a) store location and presence information for a user identified with one or more communications devices, one or more said user being associated with more than one communications devices of said one or more communications devices;

b) monitor said one or more communications devices for current location and presence status for associated users, wherein said more than one communications devices are monitored for each of said one or more associated users, at least one of said plurality of communications devices being connected to a Local Area Network (LAN) and at least one other of said plurality of communications devices being connected to a telephone network connected to said LAN;

c) compare said current location and presence status for each identified user to said stored said location and presence information for said each identified user to identify inconsistencies, inconsistencies including a system user indicated as being at a communications device other than an associated one; and d) send a notification to a corresponding identified user at one of said one or more communications devices.

25. A non-transitory computer-readable medium as in claim 24, wherein inconsistencies further include a system user logging on to a computer at a location other than a currently expected location and said notification is provided as a text message displayed by at least one of said one or more communications devices.

26. A non-transitory computer-readable medium as in claim 24, the plurality of instructions further comprising the step of:

e) updating stored said location and presence information for said each associated user.

* * * * *